(No Model.)

J. G. AVERY.
WATER FILTER.

No. 582,496. Patented May 11, 1897.

Witnesses
E.G. McKee
K. A. Nau

Inventor
John G. Avery
by John Wedderburn
his Attorney though the same into two compartments, and caps or nuts secured in the threaded openings in the outer ends thereof and having the inner surfaces chamfered to allow the passage of water from one compartment to the other, substantially as described.

UNITED STATES PATENT OFFICE.

JOHN G. AVERY, OF SPENCER, MASSACHUSETTS.

WATER-FILTER.

SPECIFICATION forming part of Letters Patent No. 582,496, dated May 11, 1897.

Application filed June 3, 1896. Serial No. 594,063. (No model.)

*To all whom it may concern:*

Be it known that I, JOHN G. AVERY, a citizen of the United States, residing at Spencer, in the county of Worcester and State of Massachusetts, have invented certain new and useful Improvements in Water-Filters; and I do hereby declare the following to be a full, clear, and exact description of the invention, such as will enable others skilled in the art to which it appertains to make and use the same.

My invention relates to filters, the object of the same being to provide a simple, cheaply-constructed, and effective filter which is adapted to be inserted upon an ordinary water-faucet and to be reversed for the purpose of cleaning the same.

The invention consists of a filtering-chamber having openings at the top and bottom thereof for the admission and discharge of water and a central horizontal partition dividing said chamber into two compartments, one filled with bone-charcoal and the other with quartz, the sides and ends of said chamber having openings therein which are internally screw-threaded, a screen covering said openings, and caps or nuts for closing the same, having the inner surfaces thereof chamfered to permit the passage of the water from one compartment of the filtering-chamber to the other.

The invention also consists in other details of construction and combinations of parts, which will be hereinafter more fully described and claimed.

Figure 1:
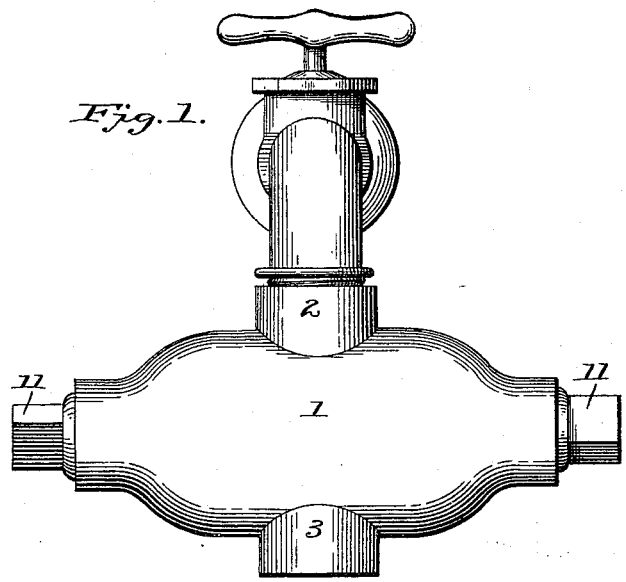
Figure 3:
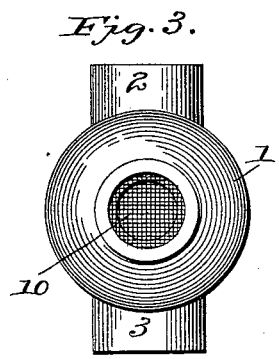
Figure 2:
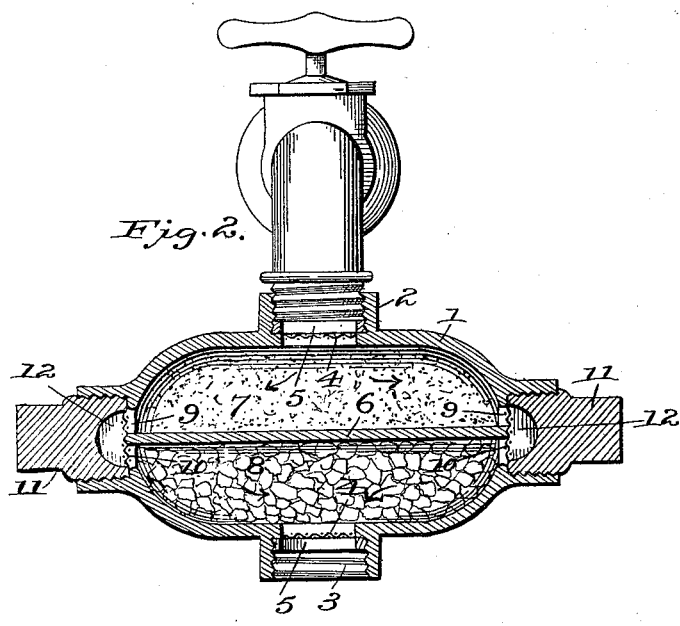
Figure 4:
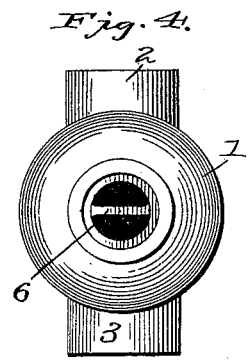

In the drawings forming part of this specification, Figure 1 represents a side elevation of my improved filter shown applied to an ordinary faucet. Fig. 2 is a vertical longitudinal section through the same. Fig. 3 is an end view with the inclosing-cap removed. Fig. 4 is a similar view with the screen also removed.

Like reference-numerals indicate like parts in the different views.

The filtering-chamber 1 is formed with bosses or extensions 2 3 upon the upper and lower sides thereof, which are screw-threaded, as shown, and adapted to be screwed upon the end of an ordinary faucet, as clearly shown in Fig. 1. The openings formed in these extensions for the admission and escape of the water may be covered by screens 4 4, of fine-mesh wire-netting, which are held in place by the annular rings 5 5.

Extending longitudinally of the filtering-chamber 1 is a central horizontal partition 6, dividing said filtering-chamber into two compartments 7 8, the compartment 7 being filled with bone-charcoal or other suitable material and the compartment 8 with quartz or similar filtering substance.

Openings 9 9 are formed in the outer ends of the filtering-chamber, which may have screens 10 10 therein, soldered to the outer end of the partition 6 and closed by caps 11 11, having rectangular outer ends, by means of which they may be inserted and removed, and having their inner surfaces chamfered, as shown at 12.

As thus constructed it will be seen that either end of my improved filter may be attached to the faucet by screwing the same thereon and that the water from the faucet first passes through one of the screens 4, thence through the filtering material in the compartment 7 to the outer ends of the filtering-chamber, passing through the screens 10, through the chamfered portion of the closing-caps 11, and thence through the filtering material in the compartment 8 and out of the device through the opening in the extension 3 at the lower end thereof. The water is thus brought into contact with all of the filtering material and is thoroughly filtered before it is emitted from the filtering-chamber.

When it is desired to clean the same, it is merely necessary to reverse the device, when the dirt or other impurities will be forced out through the same end in which they were admitted.

Instead of forming the caps 11 with rectangular outer ends for the insertion of a wrench, I may make them round with rectangular openings therethrough for the reception of a turning-key. This, however, is a mere detail.

Having now described my invention, what I claim as new, and desire to secure by Letters Patent, is—

1. A filter having threaded openings at the top and bottom thereof, by means of which it may be attached to an ordinary faucet and threaded openings in the outer ends thereof, screens in the openings at the top, bottom and two ends of said filter, a partition dividing the same into two compartments, each of which is filled with filtering material and passages at the outer ends of said partition leading from one compartment to the other, the screens in the openings at the outer ends of said filter being located across said passages.

2. A filter having threaded openings at the top and bottom thereof, by means of which it may be attached to an ordinary faucet and threaded openings in the outer ends thereof, a longitudinal partition dividing said filter into two compartments, one of which is filled with bone-charcoal and the other with quartz, screens soldered or otherwise secured to the outer ends of said partition, caps or covers having chamfered inner surfaces in the openings in the outer ends of said filter and passages leading from one compartment to the other, the said screens being located across said passages and said passages being partially formed by the chamfered inner surfaces of said caps, substantially as and for the purpose described.

In testimony whereof I have signed this specification in the presence of two subscribing witnesses.

JOHN G. AVERY.

Witnesses:
FRANK W. WILSON,
PIERRE A. RICHARD.